United States Patent [19]
Goto

[11] Patent Number: 5,366,795
[45] Date of Patent: Nov. 22, 1994

[54] MAGNETIC RECORDING MEDIUM HAVING THREE LAYERS EACH CONTAINING PARTICLES AND A BINDER WHEREIN THE RELATIONSHIP OF PARTICLE CRYSTAL SIZE IN THE SECOND AND THIRD LAYERS IS SPECIFIED

[75] Inventor: Narito Goto, Hino, Japan
[73] Assignee: Konica Corporation, Tokyo, Japan
[21] Appl. No.: 139,279
[22] Filed: Oct. 19, 1993
[30] Foreign Application Priority Data

Oct. 21, 1992 [JP] Japan ................... 4-283031

[51] Int. Cl.⁵ .............................................. G11B 5/00
[52] U.S. Cl. ................................... 428/212; 428/323; 428/336; 428/425.9; 428/694 BM; 428/694 BS; 428/694 BH; 428/900
[58] Field of Search ........... 428/212, 323, 336, 425.9, 428/694 BM, 694 BS, 694 BH, 900

[56] References Cited
U.S. PATENT DOCUMENTS 4,851,289  7/1989  Ogawa et al. .................. 428/329
5,066,534 11/1991  Goto et al. ..................... 428/212
5,094,904  3/1992  Kawakami et al. ............. 428/212
5,149,585  9/1992  Goto et al. ..................... 428/323
5,252,392 10/1993  Goto et al. ..................... 428/336

*Primary Examiner*—Stevan A. Resan
*Attorney, Agent, or Firm*—Jordan B. Bierman

[57] ABSTRACT

A magnetic recording medium is disclosed. The recording medium comprises a support; a first magnetic layer provided at the position farthest from the support which comprises magnetic particles and a binder; a second layer contacted with the surface of the first layer faced to the support which comprises particles having a crystal size of $S_2$ (nm) and a binder; and a third layer provided at a position between the second layer and the support which comprises particles having an crystal size of $S_3$ (nm) and a binder, and the $S_2$ and $S_3$ have the following relations;

$S_2 \leq 35$ and $S_2 < S_3$.

6 Claims, 2 Drawing Sheets

- 1ST. LAYER
- 2ND. LAYER
- 3RD. LAYER

SUPPORT →

SUPPORT →

SUPPORT →

MAGNETIC RECORDING MEDIUM HAVING THREE LAYERS EACH CONTAINING PARTICLES AND A BINDER WHEREIN THE RELATIONSHIP OF PARTICLE CRYSTAL SIZE IN THE SECOND AND THIRD LAYERS IS SPECIFIED

FIELD OF THE INVENTION

This invention relates to a magnetic recording medium and particularly to a magnetic recording medium excellent in surface property, electric property and running property so suitable as to serve as a digital recording medium.

BACKGROUND OF THE INVENTION

In conventional magnetic recording media, a high quality has been tried to provide by making magnetic powder fine in one case, or by arranging a multilayered structure in which a magnetic layer is arranged to the upper layer and a non-magnetic layer, to the lower layer, respectively, in the other case. Refer to Japanese Patent Application Open to Public Inspection (hereinafter referred to as JP OPI Publication) No. 63-187418/1988.

In the former case, however, magnetic powder only is made fine and, in the latter case of JP OPI Publication No. 63-187418/1988, the dispersibility of magnetic or non-magnetic powder is inferior in a coating material for forming a magnetic or non-magnetic layer, because the configuration of the non-magnetic powder is inappropriate, and a calenderability is deteriorated in a calendering treatment, so that the surface property of a magnetic recording medium cannot be resulted in a satisfactory condition. It has, therefore, been difficult to obtain a magnetic recording medium excellent in electric property and running property required for serving as a digital recording medium.

Generally in a multilayered magnetic recording medium, the surface property of the uppermost layer is seriously affected by the surface property of the layer adjacent lower to the uppermost layer. This tendency becomes more apparent as the thickness of the uppermost magnetic layer is getting more thinner.

Therefore, for improving the surface property of the uppermost magnetic layer, it is required to improve the surface property of the layer adjacent lower to the uppermost layer. For satisfying the requirement, it is effective to make fine a powder applied to the layer adjacent lower to the uppermost layer so that the dispersibility of the powder can be improved by making use of a binder containing a polar group. Refer to JP OPI Publication No. 4-57217/1992. However, as the powder applicable to the lower layer is made fine, the physical properties such as Young's modulus are deteriorated so as to raise such a problem that a running property at a low temperature and a head-touch property, or an envelope property, are deteriorated. The problem is getting more serious as a tape is made more thinner for making it longer in length.

SUMMARY OF THE INVENTION

It is an object of the invention to provide a magnetic recording medium improved in the surface property thereof and excellent in electric property and running property so as to suitably serve as a digital recording medium.

The magnetic recording medium of the invention is comprised of a support bearing thereon at least three layers; namely; (1) a magnetic layer comprising magnetic powder and a binder, that is the uppermost layer arranged to the furthest position from the support, hereinafter referred to as the first layer; (2) a layer comprising a particle having a crystal size of $S_2$ (nm) and a binder, that is arranged underneath the surface of the above-mentioned magnetic layer on the support side so as to come into close contact with each other, hereinafter referred to as the second layer; and (3) a layer comprising a particle having a crystal size of $S_3$ (nm) and a binder, that is interposed between the above-mentioned Layer 2 and the support, hereinafter referred to as the third layer; and the crystal sizes $S_2$ and $S_3$ have a relation of $S_2 \leq 35$ nm and $S_2 < S_3$.

In the preferable embodiments of the magnetic recording media of the invention, there are the following relations.

(1) Between an average major axis length $L_2$ nm of the particles contained in the second layer and an average major axis length $L_3$ nm of the particles contained in the third layer, there are relations of $L_2 < 200$ nm and $L_2 < L_3$;

(2) Between a crystal size $S_1$ of magnetic powder contained in the first layer and a crystal size $S_2$ of particles contained in the second layer, there is a relation Of $S_1 > S_2$;

(3) Among a Young's modulus $Y_1$ (Kg/mm$^2$) of the first layer, a Young's modulus $Y_2$ (Kg/mm$^2$) of the second layer and a Young's modulus $Y_3$ (Kg/mm$^2$) of the third layer, there are the relations of $Y_1 > Y_2$ and $Y_3 > Y_2$; and (4) Each of the above-mentioned three layers contains polyurethane as a binder and, when a glass transition point Tg of the polyurethane contained in the first layer is called $T_1$ (° C.), that in the second layer is called $T_2$ (° C.), and that in the third layer is called $T_3$ (° C.), there are the relations of $T_1 > T_2$ and $T_3 > T_2$.

In the embodiments of the invention, the powder to be contained in the second and third layers are preferable to be needle-shaped non-magnetic powder. An overcoat layer may also be arranged onto the first layer that is the uppermost layer, if required.

The "crystal size" in this specification means the same as that so called "crystallite size". The crystal size can be measured by Scheller method in which the crystal size is determined from the integral width of (110) diffraction lay of Fe measured by an X-ray diffractometer with silicon powder as standard substance.

The "average length of major axis" of the powder is determined as an average value of the major axis lengths of 500 particles of the powder measured by a transmission type electron microscope.

A magnetic or non-magnetic powder having a crystal size or the average major axis length is available on market.

The crystal size or average major axis length of magnetic or non-magnetic powder can be controlled by selecting an adequate raw material, controlling reaction conditions for preparation of the powder such as temperature, reacting time, pressure or pH value, and selection of kind and amount of various elements used as an anti-sintering agent or a configuration controlling agent.

The problems caused when finely granulated powder is used in the second layer closely attached to the underneath of the first layer, or uppermost layer, such as the deterioration of a Young's modulus, the foregoing inferior running durability at a low temperature and the head-touch property, can be restored and improved by making use of powder having a relatively large particle size in the third layer that is further arranged to the underneath of the second layer. The above-mentioned improvement can hardly be achieved with any media having a conventional double-layered structure.

DETAILED DESCRIPTION OF THE INVENTION

Figure 1:
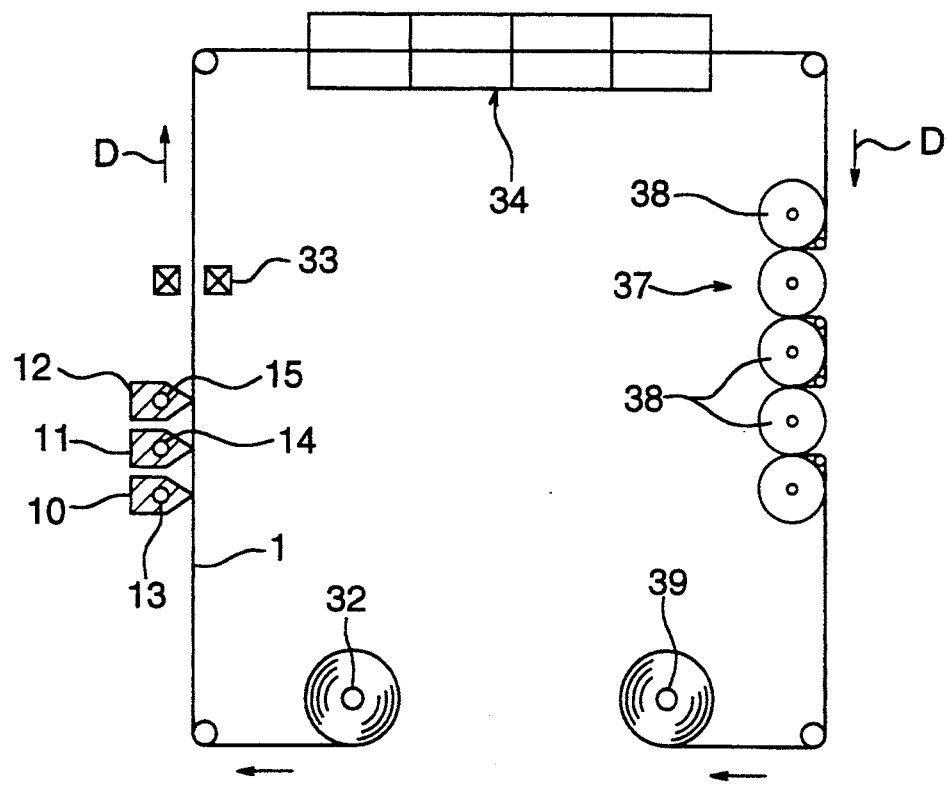
FIG. 1 is a diagram illustrating a simultaneous multi-layer coating operation for preparing a magnetic recording medium of the invention when making a wet-on-wet coating in an extrusion coating system.

In the invention, it is preferable that the foregoing crystal sizes $S_2$ and $S_3$ have a relation of $S_3-S_2 \geq 2$ nm and that the crystal sizes a and b have a relation of $S_3-S_2 \geq 7$ nm.

The above-mentioned $S_2$ is to be, preferably, $S_2 \leq 30$ nm and, more preferably, $S_2 \leq 25$ nm.

In the magnetic powder contained in the first layer, the crystal size $S_1$ thereof is to have a relation of, preferably, 5 nm $\leq S_1 \leq 35$ nm and, more preferably, 5 nm $\leq S_1 \leq 15$ nm. And, $S_1$ and $S_2$ are to have a relation of, preferably, $S_1-S_2 \geq 2$ nm and, more preferably, $S_1-S_2 \geq 4$ nm.

On the other hand, average major axis lengths $L_2$ and $L_3$ are to have a relation of, preferably, $L_3-L_2 \geq 20$ nm and, more preferably, $L_3-L_2 \geq 70$ nm.

$L_2$ is to have a relation of, preferably $L_2 \leq 170$ nm and, more preferably, $L_2 \leq 150$ nm.

The foregoing non-magnetic needle-shaped powder to be contained in the second or third layer include, preferably, $\alpha$-$Fe_2O_3$ or $\alpha$-FeOOH. Between them, $\alpha$-$Fe_2O_3$ is particularly preferable.

The foregoing magnetic powder to be used in the first layer include, preferably, a ferromagnetic metal powder or hexagonal ferrite powder. Between them a ferromagnetic metal powder is particularly preferable.

The layer thickness of the second layer is preferably not thinner than 0.2 m and, more preferably, not thinner than 0.5 μm from the viewpoint of keeping the surface property of the layer excellent. In other words, the layer thickness thereof is to be within the range of 0.5 to 2.0 μm and, preferably, 0.5 to 1.0 μm.

In the embodiments of the invention, it is preferable to make the first and third layers relatively harder and to make the second layer relatively softer. When this is the case, a calenderability can be improved and the surface smoothness of the second layer can then be improved. Resultingly, the surface smoothness of the first layer can also be improved and thereby an electromagnetic conversion property can be improved.

The first layer is to have a Young's modulus of, preferably, $Y_1 \geq 500$ Kg/mm$^2$, more preferably, $Y_1 \geq 600$ Kg/mm$^2$ and, further preferably, $Y_1 \geq 700$ Kg/mm$^2$. Among the first, second and third layers, they have a Young's modulus relations of, preferably, $Y_1-Y_2 \geq 50$ Kg/mm$^2$ and $Y_3-Y_2 \geq 50$ Kg/mm$^2$ and, more preferably, $Y_1-Y_2 \geq 100$ Kg/mm$^2$ and $Y_3-Y_2 \geq 100$ Kg/mm$^2$. How to measure a Young's modulus will be detailed in the following examples.

In a magnetic recording medium of the invention, it is preferable that the above-mentioned three layers are to contain polyurethanes having different glass transition points Tg from each other to serve as the binders. The glass transition point $T_1$ of the polyurethane contained in the first layer has a relation of, usually, 100° C.$\geq T_1 \geq -20°$ C., preferably, 100° C.$\geq T_1 \geq 0°$ C. and, more preferably, 100° C.$\geq T_1 \geq 20°$ C. The glass transition points of the first, second and third layers, $T_1$, $T_2$ and $T_3$, are to have the relations of, preferably, 100° C.$\geq T_1-T_2 \geq 20°$ C. and 100° C.$\geq T_2-T_3 \geq 20°$ C. and, more preferably, 100° C.$\geq T_1-T_2 \geq 30°$ C. and 100° C.$\geq T_2-T_3 \geq 30°$ C. How to measure them will be detailed in the following examples.

For providing the third layer with a Young's modulus higher than that of the second layer, it is more preferable to use the following countermeasures in combination, namely; the use of a polyurethane having a yielding point besides the controls of a crystal size and an average particle size of the foregoing powder; an increase of the hardness of a binder used therein; an increase of a proportion of a thermoplastic resin to a polyurethane used; an increase of a hardener used; and a reduction of an amount of an additive used.

Now, the constitution of a magnetic recording medium of the invention will be detailed below.

(A) Non-magnetic support

The materials for forming the above-mentioned non-magnetic support include, for example, polyesters such as polyethylene terephthalate and olyethylene-2,6-naphthalate, polyolefins such as polypropylene, cellulose derivatives such as cellulose triacetate and cellulose diacetate, and plastics such as polyamide, aramide resin and polycarbonate.

The configurations of the above-mentioned non-magnetic support shall not specially be limited and mainly include, for example, the tape-shaped, film-shaped, sheet-shaped, card-shaped, disk-shaped and drum-shaped.

The thickness of the non-magnetic support shall not specially be limited. In the case of the film- or sheet-shaped, the thickness thereof is within the range of, usually, 2 to 100 μm and, preferably, 3 to 50 μm. In the case of the disk- or card-shaped, the thickness thereof is within the range of about 30 μm to 10 mm. In the drum-shaped, the thickness thereof may suitably be so selected as to meet a recorder or the like to be used.

The non-magnetic support may have either of the single-layered or multilayered and may also be surface-treated in, for example, a corona-discharge treatment.

For improving the running property of a magnetic recording medium and preventing an electric-charge generation and image-transfer, it is preferable to arrange a back-coat layer to the surface of a non-magnetic support to which the foregoing magnetic layer is arranged, or the back surface of the support. It is also allowed to interpose a sublayer between the magnetic layer and the non-magnetic support.

(B) The uppermost layer that is a magnetic layer

The uppermost layer that is a magnetic layer contains magnetic powder and, further, it is also allowed to contain a binder and other components, if required.

The uppermost magnetic layer has a thickness within the range of, usually, 0.01 to 0.7 μm, preferably, 0.02 to 0.6 μm and, particularly, 0.02 to 0.4 μm.

(B-1) Magnetic powder

In the invention, the uppermost magnetic layer may contain a variety of the well-known magnetic powder.

It is preferable to contain a ferromagnetic metal powder therein.

The ferromagnetic metal powder is to be contained in a proportion within the range of, usually, 60 to 95 wt %, preferably, 70 to 90 wt % and, particularly, 75 to 85 wt % of the whole solid content of the layer.

The magnetic powder applicable to the invention include, for example, ferromagnetic iron oxide powder, ferromagnetic metal powder and hexagonal tabular-shaped ferromagnetic powder.

Among the magnetic powder, ferromagnetic metal powder and hexagonal ferrite powder can suitably be used.

The ferromagnetic iron oxide powder include, for example, $\gamma$-$Fe_2O_3$, $Fe_3O_4$, an intermediate iron oxide compound represented by $FeO_x$, in which $1.33 < X < 1.5$, and a compound having a Co-adduct (that is cobalt-denatured) represented by $Co$-$FeO_x$, in which $1.33 < X < 1.5$.

The ferromagnetic metal powder include, for example, not only Fe and Co, but also those of the Fe-Al, Fe-Al-Ni, Fe-Al-Zn, Fe-Al-Co, Fe-Al-Ca, Fe-Ni, Fe-Ni-Al, Fe-Ni-Co, Fe-Ni-Si-Al-Mn, Fe-Ni-Si-Al-Zn, Fe-Al-Si, Fe-Ni-Zn, Fe-Ni-Mn, Fe-Ni-Si, Fe-Mn-Zn, Fe-Co-Ni-P, Ni-Co and a magnetic metal powder mainly comprising Fe, Ni and Co. Among them, an Fe metal powder is excellent in electric property.

From the viewpoints of anti-corrosion and dispersion properties, on the other hand, it is preferable to use an Fe-Al ferromagnetic metal powder such as those of the Fe-Al-Ca, Fe-Al-Ni, Fe-Al-Zn, Fe-Al-Co, Fe-Ni-Si-Al-Co and Fe-Co-Al-Ca.

The ferromagnetic metal powder particularly preferable to achieve the objects of the invention is a magnetic metal powder mainly comprising iron. They are preferable to contain Al in a ratio by weight to Fe, Fe:Al, within the range of 100:0.5 to 100:20 or to contain Al and Ca of which Ca in a ratio by weight to Fe, Fe:Ca, within the range of 100:0.1 to 100:10.

When the ratio of Fe:Al is set within the above-mentioned range, the anti-corrosion property can remarkably be improved and, when the ratio of Fe:Ca is set in the above-mentioned range, the elctromagnetic conversion property can also be improved, so that a drop-out production can be reduced.

The reasons why the electromagnetic conversion property can be improved and why the drop-out production can be reduced are still unknown. However, the answers to the reasons may be derived from the effects of a coercive force improvement and a flocculate reduction.

In the ferromagnetic powder applicable to the first layer of the magnetic recording medium of the invention, the crystal size measured by X-ray diffractometry is not larger than, usually, 17 nm, preferably, 15 nm and, particularly, 12 nm. The average major axis length of the particles is, usually, shorter than 300 nm, preferably, within the range of 40 to 200 nm and, particularly, 50 to 170 nm. When the crystal sizes and the average major axis lengths of particles are within the above-mentioned ranges, the surface property of a magnetic recording medium can be improved and, at the same time, the electromagnetic property thereof can also be improved.

The above-mentioned average major axis length is an average value obtained from the major axis lengths of 500 particles of ferromagnetic metal powder measured in a transmission type electromicroscopic photography. The crystal sizes are measured in a Scheller's method in which Si powder is used as a criterion and the integral width of Fe (110) diffracted rays through an X-ray diffractometer. And, an axis ratio, an average major axis length/an average minor axis length, is obtained by measuring the average major and minor axis lengths of 500 particles of the powder.

In the ferromagnetic powder applicable to the invention, the coercive force (Hc) thereof is preferable to be within the range of, usually, 600 to 5,000 Oe.

In the above-mentioned ferromagnetic powder, it is preferable that the saturation magnetization ($\sigma s$), that is a magnetic property, is usually not less than 70 emu/g. When a saturation magnetization is less than 70 emu/g. In particular, when the above-mentioned ferromagnetic powder is a ferromagnetic metal powder, it is preferable that the saturation magnetization is not less than 120 emu/g.

In the invention, it is preferable to use a ferromagnetic metal powder having a specific surface area of not narrower than 30 $m^2$/g and, particularly, not narrower than 45 $m^2$/g in a BET method so as to meet the tendency of making an record higher in density.

The above-mentioned specific surface area and the method of measuring the same are detailed in J. M. Dallavelle and Clayeorr, translated by Muta et al, "Powder measurements", published by Sangyo Tosho Co. and in "A Handbook of Chemistry", The section of Application, pp. 1170 to 1171, compiled by The Chemical Society of Japan, published by Maruzen Bookstore, Ltd., issued by Apr. 30, 1966.

The above-mentioned specific surface area is measured in the following manner. For example, powder is degassed while heating it at about 105° C. for 13 minutes so as to remove a matter adsorbed to the powder. The powder is then introduced into a measurement instrument and the initial nitrogen pressure is set to be 0.5 kg/$m^2$. Then, the specific surface area is measured by nitrogen at a temperature of liquid nitrogen ($-105°$ C.) for 10 minutes.

As for the measurement instrument, a Quantasoap, manufactured by Yuasa-Ionix Co., Ltd., is used.

The ferromagnetic powder is preferable to have the following structure. A structure in which the proportion of Fe atoms to Al atoms each contained in the ferromagnetic powder is Fe:Al within the range of 100:1 to 100:20 in terms of a ratio of atom numbers and, in a surface region with a depth of not more than 100 Å determined by ESCA analysis of the ferromagnetic powder, the proportion of Fe atoms to Al atoms contained therein is Fe:Al within the range of 30:70 to 70:30 in terms of a ratio of atom numbers; or, another structure in which Fe, Ni, Al and Si atoms are contained in a ferromagnetic powder, at least one of Co and Ca atoms is contained in the ferromagnetic powder, the Fe atom content is not less than 90 atomic % (percentage in number of atoms), the Ni atom content is within the range of 1 atomic % to less than 10 atomic %, the Al atom content is within the range of not less than 0.1 atomic % to less than 5 atomic %, the Si atom content is within the range of not less than 0.1 atomic % to less than 5 atomic %, the Co and/or Ca atom contents are within the range of not less than 0.1 atomic % to less than 13 atomic % (provided, when containing both of Co and Ca atoms, the total contents thereof are regarded as the content.) and, in a surface region with a depth of not more than 100 Å determined by ESCA analysis of the ferromagnetic powder, the proportions of Fe, Ni, Al, Si, Co and/or Ca atoms each contained therein are Fe:Ni:Ai:Si(:Co and/or Ca) within the range of 100:(not more than 4):(10 to 60):(10 to 70):(20 to 80) in terms of atom numbers.

The ferromagnetic metal powder preferably comprises Fe, Al and one or more kinds of rare-earth elements selected from Sm, Nd, Y and Pr.

The ferromagnetic metal powder in the invention is preferably composed of 100 parts by weight of Fe, 2 to 10 parts by weight of Al and 1 to 8 parts by weight of the above rare-earth elements in the whole composition, and that in the surface region of the powder particle, the number ratio of atoms is 100 of Fe, 70 to 200 of Al and 0.5 to 30 of the above rare-earth elements.

It is more preferable that the ferromagnetic metal powder further contains Na and Ca as components thereof, and that the ferromagnetic metal powder composed of 100 parts by weight of Fe, 2 to 10 parts by weight of Al, 1 to 8 parts by weight of the above rare-earth elements, less than 0.1 parts by weight of Na and 0.1 to 2 parts by weight of Ca in the whole composition, and that in the surface region of the powder particle, the number ratio of atoms is 100 of Fe, 70 to 200 of Al, 0.5 to 30 of the above rare-earth elements, 2 to 30 of Na and 5 to 30 of Ca.

It is further preferable that the above ferromagnetic metal powder further contains Co, Ni and Si as components thereof, and that the ferromagnetic metal powder composed of 100 parts by weight of Fe, 2 to 20 parts by weight of Co, 2 to 20 parts by weight of Ni, 2 to 10 parts by weight of Al, 0.3 to 5 parts by weight of Si, 1 to 8 parts by weight of the above rare-earth elements, less than 0.1 parts by weight of Na and 0.1 to 2 parts by weight of Ca in the whole composition, and that in the surface region of the powder particle, the number ratio of atoms is of 100 of Fe, less than 0.1 of Co, less than 0.1 of Ni, 70 to 200 of Al, 20 to 130 of Si, 0.5 to 30 of the above rare-earth elements, 2 to 30 of Na and 5 to 30 of Ca.

The ferromagnetic metal powder which have contents of Fe, Co, Ni, Si, one or more rare-earth elements selected from Sm, Nd, Y and Pr, Na and Ca in the whole composition and in the surface region within the above-mentioned ratio is preferable because it has a high coercive force (Hc) of 1700 Oe or more and a high saturated magnetization of 120 emu/g or more.

The foregoing hexagonal tabular-shaped powder include, for example, hexagonal ferrite. The hexagonal ferrite is comprised of barium ferrite, strontium and so forth and a part of iron element may also be substituted with other elements such as Ti, Co, Zn, In, Mn, Ge and Hb. These ferrite magnetic substances are detailed in IEEE trans on Mag-18 16 (1982).

Among them, barium ferrite may preferably be used in the invention.

The above-mentioned magnetic powder of barium ferrite, hereinafter referred to as Ba-ferrite, include, for example, Ba-ferrite, whereof a part of Fe is substituted with at least Co and zn, the average particle size, that is a diagonal length of the tabular-shaped surface of hexagonal ferrite, is within the range of 400 Å to 900 Å. The tabular-shaped ratio, that is a value obtained by dividing the diagonal length of the tabular-shaped surface of hexagonal ferrite, is within the range of 2.0 to 10.0 and, preferably, 2.0 to 6.0, and the coercive force (Hc) is within the range of 450 to 1500 Oe.

In Ba-ferrite powder, when Fe is partly substituted with Co, the coercive force thereof can suitably be controlled and, when Fe is partly substituted with Zn, a saturation magnetization can be obtained so high that it cannot be obtained only by a Co-substitution. Therefore, a magnetic recording medium can be obtained to be excellent in electromagnetic properties including a high reproduction output. Also, when Fe is partly substituted with Nb, a magnetic recording medium can be obtained to be excellent in electromagnetic properties with a higher reproduction output. Further, Fe of Ba-ferrite applicable to the invention may be partly substituted with a transition metal such as Ti, In, Mn, Cu, Ge and Sn.

Ba-ferrite applicable to the invention can be represented by the following formula.

$$BaO \cdot n[(Fe_{1-m}M_m)_2O_3]$$

wherein m is more than 0.36 provided, Co+Zn=0.08 to 0.3 and Co/Zn=0.5 to 10, n is 5.4 to 11.0 and, preferably, 5.4 to 6.0, and M represents a substitution metal that is preferable to be magnetic particle combined with 2 or more kinds of elements of which the average valence number of 3.

When preparing a magnetic recording medium to make the reproduction output satisfactory, it is preferable to set an average particle size of the Ba-ferrite thereof to be not less than 300 Å. When improving a surface smoothness and lowering a noise level, it is preferable to set to be not more than 900 Å. When setting an aspect ratio to be not less than 2.0, a vertical orientation ratio suitable for a high density recording can be obtained when preparing a magnetic recording medium. For improving the surface smoothness and lowering the noise level, it is preferable to set the aspect ratio to be not more than 10.0. And, for maintaining a recording signal, it is preferable to set a coercive force to be not less than 450 Oe. Further, for preventing a head from saturation, it is preferable to set the coercive force to be not more than 1,500 Oe.

In the Ba-ferrite magnetic powder applicable to the invention, it is preferable that a magnetic saturation ($\sigma s$) that is a magnetic property is ordinarily not less than 50 emu/g. When the magnetic saturation is less than 50 emu/g, an electromagnetic property is apparently deteriorated.

Further in the invention, it is preferable to use a Ba-ferrite magnetic powder of which the specific surface area measured in a BET method is not narrower than 30 $m^2/g$ so as to meet a high density recording requirement.

The processes for preparing a hexagonal magnetic powder applicable to the invention include, for example, the following processes. A glass crystallizing process comprising the steps of fusing each of the oxides or carbonates necessary to produce an objective Ba-ferrite together with a glass forming substance such as boric acid, quenching the resulting fused liquid to produce glass, heat-treating the resulting glass at a specific temperature, then separating the objective Ba-ferrite crystallized powder, and finally removing the glass components in a heat-treatment; and, besides the above, a co-precipitation-baking process, a hydrothermal synthesizing process, a flux process, an alkoxide process and a plasma-jet process.

In the invention, a ratio of the major axis diameter (a) of the above-mentioned ferromagnetic powder contained in a magnetic layer to the major axis diameter (b) of non-magnetic powder contained in a non-magnetic layer that is a lower layer, i.e., the axis ratio of (b):(a), is preferably not more than 3, more preferably not more than 2.5 and, particularly not more than 2. Because, when an axis ratio is within the above-mentioned range, the surface property of a magnetic recording medium, for example, can be maintained in the excellent state, so that an excellent property can be displayed.

The above-mentioned magnetic powder can be used independently or in combination.

(B-2) Binder

The binders contained in the uppermost layer that is a magnetic layer include, typically, polyurethane, polyester and vinyl chloride type resin such as vinyl chloride type copolymer. These resins are preferable to contain a repetition unit having at least one polar group selected from the group consisting of —$SO_3M$, —O-$SO_3M$, —COOM, —$PO(OM^1)_2$ and sulfobetaine group. As mentioned before, polyurethane having a Tg within the range of —20° C. to 100° C. may preferably be used. The preferable amount of polyurethane is 10 to 80%, more preferable 20 to 60%, by weight of the whole amount of the binder.

In the above-given polar groups, M represents a hydrogen atom an alkali atom such as those of Na, K and Li, or an alkyl group.

The above-mentioned polar groups have each a function of improving the dispersibility of magnetic powder, and the polar group content of each resin is within the range of 0.1 to 8.0 mol % and, preferably, 0.2 to 6.0 mol %. The weight average molecular weight of the resins is preferable to be within the range of 15,000 to 50,000.

The amount of a binder contained is within the range of, usually, 8 to 25 parts by weight and, preferably, 10 to 20 parts by weight to 100 parts by weight of ferromagnetic metal powder used.

The binders may be used independently or in combination. In the latter case, the proportion by weight of polyurethane and/or polyester to a vinyl chloride type resin is within the range of, usually, 90:10 to 10:90 and, preferably, 70:30 to 30:70.

The polar group-containing vinyl chloride type copolymers each applicable to the invention as a binder can be synthesized in an addition reaction of a hydroxyl group-containing copolymer such as a vinyl chloride-vinyl alcohol copolymer with a compound containing the following polar group and a hydrogen atom.

Cl-$CH_2CH_2SO_3M$, Cl-$CH_2CH_2OSO_3M$, Cl-$CH_2COOM$, and Cl-$CH_2$-P(=O) $(OM^1)_2$ Taking Cl-$CH_2CH_2SO_3Na$ as an example of the compounds, the reaction is detailed as follows.

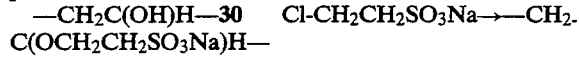
—$CH_2C(OH)H$—30  Cl-$CH_2CH_2SO_3Na$→—$CH_2$-C(O$CH_2CH_2SO_3Na$)H—

The above-mentioned polar group-containing vinyl chloride type copolymer can be prepared in the following manner comprising the steps of putting into a reaction chamber such as an autoclave a reactive monomer in a specific amount, which has an unsaturated bond into which a polar group-containing repetition unit is introduced, and making a polymerization reaction with the use of a common polymerization starter including, for example, a radical polymerization starter such as BPO (benzoyl peroxide) and ABIN (azobisisobutylonitrile), a redox polymerization starter and a cationic polymerization starter.

The concrete examples of the reactive monomers for introducing sulfonic acid or the salts thereof include, typically, an unsaturated hydrocarbon sulfonic acid such as vinyl sulfonic acid, allyl sulfonic acid, methacrylic sulfonic acid and p-styrene sulfonic acid and the salts thereof.

When introducing carboxylic acid or the salts thereof, (meth)acrylic acid or maleic acid is used, for example. When introducing phosphoric acid or the salts thereof, a (meth)acrylic acid-2-phosphoric acid ester may be used, for example.

It is preferable that a vinyl chloride type copolymer is introduced by an epoxy group. When this is the case, the thermal stability of the polymer can be improved.

When introducing an epoxy group, the content of a repetition unit having an epoxy group in a copolymer is within the range of, preferably, 1 to 30 mol % and, more preferably, 1 to 20 mol %.

The monomers for introducing an epoxy group preferably include, for example, glycidyl acrylate.

The techniques for introducing a polar group into a vinyl chloride copolymer are described in, for example, JP OPI Publication Nos. 57-44227/1982, 58-108052/1983, 59-8127/1984, 60-101161/1985, 60-235814/1985, 60-238306/1985, 60-238371/1985, 62-121923/1987, 62-146432/1987 and 62-146433/1987. These techniques may be utilized in the invention.

Next, the syntheses of polyester and polyurethane each applicable to the invention will now be detailed.

Generally, polyester can be prepared in a reaction of polyol with a polybasic acid.

In the above-mentioned well-known method, polyester (or polyol) having a polar group can be synthesized from polyol and a polybasic acid partly containing a polar group.

The examples of the polybasic acid having a polar group include 5-sulfoisophthalic acid, 2-sulfoisophthalic acid, 4-sulfoisophthalic acid, 3-sulfophthalic acid, dialkyl 5-sulfoisophthalic acid, dialkyl 2-sulfoisophthalic acid, dialkyl 4-sulfoisophthalic acid and dialkyl 3-sulfoisophthalic acid, and the sodium or potassium salts thereof.

The examples of polyols include trimethylol propane, hexane triol, glycerol, trimethylol ethane, neopentyl glycol, pentaerythritol, ethylene glycol, propylene glycol, 1,3-butane diol, 1,4-butane diol, 1,6-hexanediol, diethylene glycol and cyclohexanedimethanol.

A polyester introduced with other polar group can also be synthesized in any well-known method.

Now, polyurethane will be detailed below.

Polyurethane can be obtained in a reaction of polyol with polyisocyanate.

The polyols generally applicable thereto include, for example, polyester polyol synthesized in a reaction of polyol with a polybasic acid.

Therefore, polyurethane having a polar group can be synthesized by making use of polyester polyol having a polar group as the raw material thereof.

The examples of polyisocyanate include, typically, diphenylmethane-4-4'-diisocyanate (MDI), hexamethylene diisocyanate (HMDI), tolylene diisocyanate (TDI), 1,5-naphthalene diisocyanate (NDI), tolidine diisocyanate (TODI), and lysine isocyanate methyl ester (LDI).

As for the other method for synthesizing polyurethane having a polar group, an addition reaction of polyurethane having a hydroxyl group with a compound having a chlorine atom can also effectively be used.

Some of the techniques for introducing a polar group into polyurethane are described in, for example, JP Examined Publication No. 58-41565/1983 and JP OPI Publication Nos. 57-92422/1982, 57-92423/1982, 59-8127/1984, 59-5423/1984, 59-5424/1984 and 62-121923/1987. These techniques may also be utilized in the invention.

In the invention, the following resins may be used as a binder in a proportion of not more than 50 wt % of the whole binder used.

The resins include, for example, a vinyl chloride-vinyl acetate copolymer, a vinyl chloride-vinylidene chloride copolymer, a vinyl chloride-acrylonitrile copolymer, butadiene-acrylonitrile copolymer, polyamide resin, polyvinyl butyral, a cellulose derivative such as nitrocellulose, a styrene-butadiene copolymer, phenol resin, epoxy resin, urea resin, melamine resin, phenoxy resin, silicone resin, an acryl type resin, urea formamide resin, and various synthetic-rubber resins, each having a weight average molecular weight within the range of 10,000 to 200,000, respectively.

(B-3) Other components

In the invention, for trying to improve the quality of the uppermost layer that is a magnetic layer, an additive such as abrasives, a lubricant, a durability improver, a dispersant, an antistatic agent and an electroconductive fine powder may be contained as other components in the layer.

As for the abrasives, any well-known substances can be used.

The abrasives have an average particle size within the range of, usually, 0.05 to 0.6 $\mu$m, preferably, 0.05 to 0.5 $\mu$m and, particularly, 0.05 to 0.3 $\mu$m.

In the uppermost layer, the abrasives are contained in an amount within the range of, usually, 3 to 20%, preferably, 5 to 15 wt % and, particularly, 5 to 10 wt %.

As the lubricant, fatty acid and/or the fatty acid esters may be used. In this case, fatty acid may be added in a proportion within the range of, preferably, 0.2 to 10 wt % and, particularly, 0.5 to 5 wt % of magnetic powder used.

The amount of a fatty acid ester added is also within the range of, preferably, 0.2 to 10 wt % and, particularly, 0.5 to 5 wt % of magnetic powder used.

When a lubrication effect is tried to be enhanced by making combination use of fatty acid and a fatty acid ester, the fatty acid and the fatty acid ester are used in a weight ratio within the range of, preferably, 10:90 to 90:10.

The above-mentioned fatty acid may be of the monobasic acid type or the dibasic acid type. The carbon number thereof is within the range of, preferably, 6 to 30 and, more preferably, 12 to 22.

As for the other lubricants than the above-mentioned fatty acid and fatty acid esters, any substances well-known by itself can be used. The substances applicable thereto include, for example, silicone oil, carbon fluoride, fatty acid amide and $\alpha$-olefin oxide.

The hardeners include, for example, a polyisocyanate. These polyisocyanates include, for example, an aromatic polyisocyanate such as an adduct of tolylene diisocyanate (TDI) and an active hydrogen compound and an aliphatic polyisocyanate such as an adduct of hexamethylene diisocyanate and an active hydrogen compound. It is preferable that the above-mentioned polyisocyanate is to have a weight average molecular weight within the range of 100 to 3,000.

The dispersants include, for example, a fatty acid having 12 to 18 carbon atoms such as caprylic acid, capric acid, lauric acid, myristic acid, palmitic acid, stearic acid and oleic acid; the alkali-metal salts thereof, the alkaline earth metal salts thereof or the amides thereof; a polyalkylene oxide alkyl phosphoric acid ester; lecithin; a quaternary ammonium salt of trialkyl polyolefinoxy; and an azo type compound having a carboxyl group or a sulfonic acid group. The above-given dispersants are commonly used in a proportion within the range of 0.5 to 5 wt % of a magnetic powder used.

The antistatic agents include, for example, a cationic surfactant such as a quaternary amine; an anionic surfactant containing an acid group of sulfonic acid, sulfuric acid, phosphoric acid, a phosphoric acid ester and carboxylic acid; an amphoteric surfactant such as aminosulfonic acid; and a natural surfactant such as saponin. The above-given antistatic agents are each commonly used in a proportion within the range of 0.01 to 40 wt % of a binder used.

In the invention, an electroconductive fine powder may also preferably be used as an antistatic agent. Such antistatic agents include, for example, those made of carbon black, graphite, tin oxide, silver powder, silver oxide, silver nitrate and an organic silver compound, a metal particles such as copper powder, and those made of a pigment including a metal oxide such as zinc oxide, barium sulfate and titanium oxide coated thereon with an electroconductive substance such as a tin oxide coating material and an antimony-solid solution coating material of tin oxide.

The above-mentioned electroconductive fine powder is to have an average particle size within the range of, usually, 5 to 700 nm, preferably, 5 to 200 nm and, particularly, 5 to 50 nm.

The electroconductive fine powder is contained in a proportion within the range of 0.1 to 10 parts by weight, preferably, 0.1 to 2 parts by weight and, particularly, 0.1 to 1 part by weight to 100 parts by weight of magnetic powder used.

(C) The lower layer

Between a non-magnetic support and the foregoing first layer that is the uppermost magnetic layer, at least the foregoing second and third layers are interposed. These layers are hereinafter sometimes referred collectively to as the lower layer.

The second and third layers may be, for example, a magnetic layer containing magnetic powder (C-1), a non-magnetic layer containing non-magnetic powder (C-2) or a layer containing a material having a high magnetic permeability (C-3). These layers may also be a combination of these layers. In the invention, a non-magnetic layer (C-2) is preferred and a non-magnetic layer containing needle-shaped non-magnetic powder is particularly preferred.

The second and third layers have a thickness within the range of, usually, 0.1 to 2.5 $\mu$m, preferably, 0.2 to 2.0 $\mu$m and, particularly, 0.5 to 2.0 $\mu$m in total. The thickness of 2.5 $\mu$m or less causes lowering in the roughness of the upper most layer after coating and raising in electro-magnetic transferring property. A high smoothness of the surface can be obtained after calendering when the thickness of lower layer is not less than 0.1 $\mu$m.

(C-1) Magnetic layer used for the lower layer

A magnetic layer capable of serving as the lower layer is to contain magnetic powder and, if required, a binder and other components.

(C-1-1) Magnetic powder

There is no special limitation to the kind of magnetic powder contained in a magnetic layer of the lower layer, but the compounds exemplified in paragraph (B-I) can also suitably be used. These magnetic powder may be used independently or in combination.

Among these magnetic powder, Co-containing iron oxide is preferred. When the magnetic layer of the lower layer contains Co-containing iron oxide, a reproduction output can be made excellent in an area having a relatively longer recording wavelength and, particularly, in an area having not less than 1 μm.

The magnetic powder content is in a proportion within the range of, usually, 70 to 90 wt % and, preferably, 75 to 85 wt % of the whole solid component of a subject layer.

(C-1-2) Binder

In the lower layer, the binders contained in a magnetic layer of the lower layer include, for example, the compounds exemplified in paragraph (B-2). The amount of the binder used is within the range of, usually, 5 to 25 parts by weight and, preferably, 10 to 20 parts by weight to 100 parts by weight of ferromagnetic powder used. As the binder, polyurethane having a Tg of $-20°$ C. to 100° C. is preferably used in an amount of 10 to 80%, more preferably 20 to 60% of the whole amount of the binder.

(C-1-3) Other components

As for the other components contained in a magnetic layer of the lower layer, the compounds exemplified in paragraph (B-3) can be used. The amount thereof contained therein shall not specially be limited, but can suitably be selected, provided that the objects of the invention cannot be spoiled.

(C-2) Non-magnetic layer used for the lower layer

A non-magnetic layer used for the lower layer contains non-magnetic powder and, if required, a binder and other components.

(C-2-1) Non-magnetic powder

In the invention, a variety of well-known non-magnetic powder can suitably be selected to be used.

Non-magnetic powder include, for example, carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium oxide, conmdum, artificial diamond, $\alpha$-iron oxide, garnet, silica, silica nitride, silica carbide, molybdenum carbide, boron carbide, tungsten carbide, titanium carbide, diatom earth, and dolomite.

Among them, the preferable ones include, for example, inorganic powder such as carbon black, $CaCO_3$, $TiO_2$, barium sulfate, $\alpha$-$Fe_2O_3$, $\alpha$-FeOOH and, particularly, $\alpha$-$Fe_2O_3$.

In the invention, non-magnetic powder having a needle-shaped powder configuration can suitably be used. When the needle-shaped non-magnetic powder is used, the surface smoothness of a non-magnetic layer can be improved and, when the uppermost magnetic layer is coated on the non-magnetic layer, the surface smoothness of the uppermost layer can also be improved.

The major axis diameter of the non-magnetic powder is usually not longer than 500 nm, preferably, not longer than 400 nm and, particularly, not longer than 300 nm.

The minor axis diameter of the gnon-magnetic powder is usually not longer than 100 nm, preferably, not longer than 80 nm and, particularly, not longer than 60 nm.

The axis ratio of the non-magnetic powder is within the range of, usually, 2 to 20, preferably, 5 to 15 and, particularly, 5 to 10. The term, "an axis ratio", stated herein means a ratio of a major axis diameter to a minor axis diameter (A major axis diameter/a minor axis diameter).

The specific surface area of the non-magnetic powder is within the range of, usually, 10 to 250 $m^2/g$, preferably, 20 to 150 $m^2/g$ and, particularly, 30 to 100 $m^2/g$.

It is preferable to use a non-magnetic powder having the above-mentioned ranges of the major and minor axis diameters, axis ratio and specific surface area, because the surface property of a non-magnetic layer can be made excellent and, at the same time, the surface property of the uppermost layer that is a magnetic layer can also be made excellent.

Also in the invention, it is preferable that the non-magnetic powder is surface-treated with Si compound and/or Al compound. When making use of such a surface-treated non-magnetic powder, the surface condition of the uppermost layer that is a magnetic layer can be made excellent. As for the Si and/or Al contents, Si and Al contents are each in a proportion of, preferably, 0.1 to 5 wt % and, particularly, 0.1 to 2 wt %. The ratio by weight of Si to Al is preferably Si/Al$\geq$3. The surface treatment may be carried out in the method described in, for example, JP OPI Publication No. 2-83219/1990.

In a non-magnetic layer, the non-magnetic powder content is within the range of, usually, 50 to 99 wt %, preferably, 60 to 95 wt % and, particularly, 70 to 95 wt % of the total components constituting the non-magnetic layer. When the non-magnetic powder content is within the above-mentioned range, the surface conditions of the uppermost layer that is a magnetic layer and those of the non-magnetic layer can be made excellent.

(C-2-2) Binder

As for the binders contained in a non-magnetic layer as the lower layer, the compounds exemplified in paragraph (B-2). The amount thereof is within the range of, usually, 5 to 150 parts by weight and, preferably, 10 to 120 parts by weight to 100 parts by weight of the non-magnetic powder used therein. As the binder, polyurethane having a Tg of $-20°$ C. to 100° C. is preferably used in an amount of 10 to 80%, more preferably 20 to 60% of the total amount of the binder.

(C-2-3) Other components

As for the other components contained in a non-magnetic layer as the lower layer, the compounds exemplified in paragraph (B-3). The amounts thereof shall not specially be limited, provided the objects of the invention cannot be spoiled and, therefore, the compounds can suitably be selected.

(C-3) Layer containing a material having a high magnetic permeability used for the lower layer In a layer containing a material having a high magnetic permeability, that can be used for the lower layer, a material having a high magnetic permeability is contained and, if required, a binder and the other components may also be contained.

(C-3-1) Material having a high magnetic permeability

The coercive force (Hc) of a material having a high magnetic permeability has a relation of $0 < Hc \leq 1.0 \times 10^4$ (A/m) and, preferably, $0 < Hc \leq 5.0 \times 10^3$ (A/m). When the coercive force is within the above-mentioned range, the material having a high magnetic permeability can display the effects of stabilizing the magnetized area of the uppermost layer.

As for the materials having a high magnetic permeability applicable to the invention, it is preferable to suitably select a material having a coercive force within the above-mentioned range. Such a material having a high magnetic permeability as mentioned above includes, for example, a soft magnetic metal material and a soft magnetic oxide material.

The soft magnetic metal materials include, for example, Fe-Si alloy, Fe-Al alloy such as Alperm, Alfenol and Alfer, permalloy such as a Ni-Fe binary element alloy and a multi-element alloy prepared by adding Mo, Cu and Cr to a Ni-Fe type binary element alloy, Sendust such as an Fe-Si-Al alloy consisting of Si of 9.6 wt %, Al of 5.4 wt % and Fe of the rest, and an Fe-Co alloy. Among them, Sendust is preferable to serve as a soft magnetic metal material. The soft magnetic metal materials shall not be limited to the exemplified compounds to use as a high magnetic permeability material, but the other soft magnetic metal materials may also be used. The high magnetic permeability materials may also be used independently or in combination.

The soft magnetic oxide materials include, for example, a spinel type ferrite such as $MnFe_2O_4$, $Fe_3O_4$, $CoFe_2O_4$, $NiFe_2O_4$, $MgFe_2O_4$ and $Li_{0.5}Fe_{2.5}O_4$, a Mn-Zn type ferrite, a Ni-Zn type ferrite, a Ni-Cu type ferrite, Cu-Zn type ferrite, a Mg-Zn type ferrite and a Li-Zn type ferrite. Among them, a Mn-Zn type ferrite and a Ni-Zn type ferrite are preferably used. Further, these soft magnetic oxide materials may also be used independently or in combination.

It is preferable that the high magnetic permeability material is made to be fine powder by making use of a ball-mill or other pulvelizer so as to have a particle size within the range of 1 to 1,000 nm and, particularly, 1 to 500 nm. For preparing such a fine powder from a soft magnetic metal material, a fused alloy is sprayed in a vacuum atmosphere. Fine powder can be prepared from a soft magnetic oxide material in a glass crystallizing method, a coprecipitation-burning method, a hydrothermal synthesizing method, a flux method, an alkoxide method, a prasma-jet method and so forth.

In a layer containing the above-mentioned high magnetic permeability material, the high magnetic permeability materials is contained in a proportion within the range of, 10 to 99 wt %, preferably, 50 to 95 wt % and, particularly, 60 to 90 wt %. When the high magnetic permeability material content is within the above-mentioned range, the effect of stabilizing the magnetization of the uppermost layer can satisfactorily be displayed.

A layer containing the above-mentioned high magnetic permeability material is also allowed to contain non-magnetic particles.

(C-3-2) Binder

In a layer, that is the lower layer, containing a high magnetic permeability material, a binder contained therein include, for example the compounds exemplified in paragraph (B-2). The amount thereof contained is within the range of, usually, 5 to 30 parts by weight and, preferably, 10 to 25 parts by weight to 100 parts by weight of the high magnetic permeability material used. As the binder, polyurethane having of a Tg of −20° C. to 100° C. is preferably used in an amount of 10 to 80%, more preferably 20 to 60%, by weight to the total amount of the binder.

(C-3-3) Other components

In a layer of the lower layer containing a high magnetic permeability material, other components thereof to be contained include, for example, the compounds exemplified in paragraph (B-3). The amount thereof shall not specially be limited, but any suitable compounds can be selected, provided that the objects of the invention cannot be spoiled.

Preparation of magnetic recording medium

It is preferable to coat the magnetic recording medium of the invention in the so-called wet-on-wet system in which the upper layer is coated on the lower layers being in the wet state. In the wet-on-wet system, a method for preparing a well-known multilayer structure type magnetic recording medium may suitably be adopted.

Generally, for example, magnetic powder, a binder, a dispersant, a lubricant, an abrasive, an antistatic agent and a solvent are kneaded together to prepare a highly concentrated paint. The resulting highly concentrated paint is then diluted to prepare a paint for coating. After that the resulting coating paint is coated on the surface of a non-magnetic support.

The solvents applicable thereto include, for example, ketones such as acetone, methylethyl ketone (MEK), methylisobutyl ketone (MIBK) and cyclohexanone; alcohols such as methanol, ethanol and propanol; esters such as methyl acetate, ethyl acetate and butyl acetate; cycloethers such as tetrahydrofuran; and halogenated hydrocarbons such as methylene chloride, ethylene chloride, carbon tetrachloride, chloroform and dichlorobenzene.

When kneading and dispersing a magnetic layer forming components, various kneading-dispersing equipments may be used.

The above-mentioned kneading & dispersing equipments include, for example, a double-roll mill, a triple-roll mill, a ball mill, a pebble mill, a Co-ball mill, a Tron mill, a sand mill, a sand grinder, a Sqegvari's attriter, a high-speed impeller disperser, a high-speed stone mill, a high-speed impact mill, a Disper, a high-speed mixer, a homogenizer, a supersonic disperser, an oven kneader, a continuous kneader and a pressure kneader. Among them, the kneading & dispersing equipments capable of supplying an electric power consumption load within the range of 0.05 to 0.5 KW per Kg of magnetic powder include, for example, a pressure kneader, an oven kneader, a continuous kneader, a double-roll mill and a triple-roll mill.

The uppermost magnetic layer and other two lower layers are coated on a non-magnetic support in the following manner. Concretely, as shown in FIG. 1, a magnetic coating material for the uppermost layer and a coating material for the lower layers are multicoated, respectively, on non-magnetic support 1 conveyed from supply roll 32 in a wet-on-wet system by making use of extrusion type coaters 10, 11 and 12, then, the support multicoated thereon is passed through an orientating magnet or a vertically orientating magnet 33 to introduce the support into drier 34 and, therein the multicoated support is dried by blowing the hot air from the nozzles arranged to the upper and lower positions. Next, non-magnetic support 1 multicoated thereon with each of the dried coated layers is introduced into supercalender 37 comprising a combination of calendering rolls 38 and the support is calendered and then rolled up round take-up roll 39. The resulting magnetic film is sliced into a tape having a desired width, so that a 8mm-wide magnetic recording video tape, for example, can be prepared.

In the above-mentioned method, each of the coating materials may also be supplied through an in-line mixer (not shown) and then to extrusion coaters 10, 11 and 12. In the drawing, the arrow marks indicate the directions of transporting a non-magnetic support. Extrusion coaters 10, 11 and 12 are each provided with solution reservoirs 13, 14 and 15 so that the coating materials supplied from the coaters are multicoated on the support in a wet-on-wet system, respectively. To be more concrete, a magnetic coating material for the uppermost layer is multicoated immediately after coating a coating material for the lower layers in the undried state.

Figure 2:
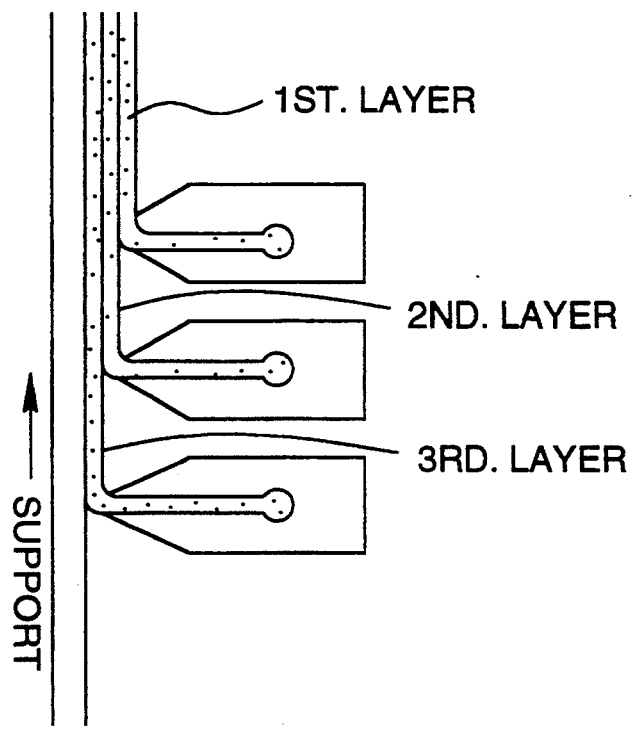
FIGS. 2(a), 2(b) and 2(c) are the diagrams each illustrating a coater-head for coating the coating materials of the invention.
Figure 2:
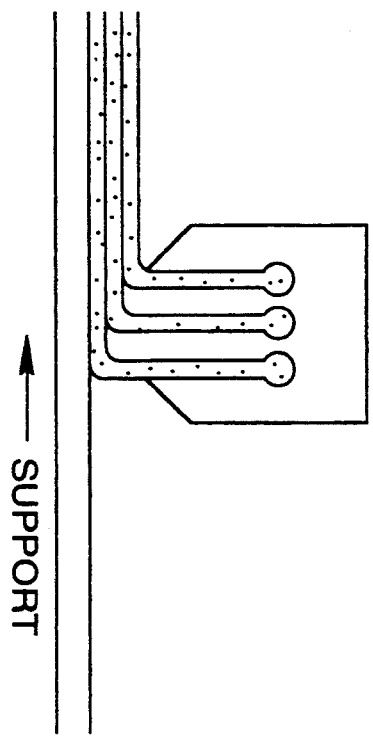
Figure 2:
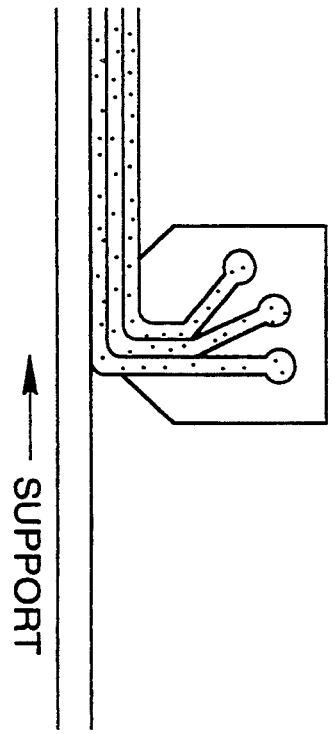

Besides the three extrusion coaters shown in FIG. 2(a), the extrusion coaters of such a type as shown in FIGS. 2(b) and 2(c) may also be used. Among these coaters, the extrusion coater of such a type as shown in FIG. 2(b) is preferably used in the invention. The coating materials each for the lower layers and the magnetic coating material for the uppermost layer are extruded and then multicoated through the extrusion coaters, respectively.

As for the solvents to be compounded in the above-mentioned coating materials or dilution solvents to be used when coating the coating paints, the following compounds can be used; namely, ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and ethylene glycol mono acetate; ethers such as glycol dimethyl ether, glycol monoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene. Various kinds of these solvents may also be used independently or in combination.

The foregoing orientation magnet or vertical orientation magnet has a magnetic field within the range of 20 to 10,000 approximately. The drying temperature of a dryer used is within the range of 30° to 120° C. approximately. And, the drying time is within the range of 0.1 to 10 minutes approximately.

In the wet-on-wet system, a combination of a reverse roll and an extrusion coater, a combination of a gravure roll and an extrusion coater, and so forth may also be used. It is further allowed to make combination use of an air-doctor coater, a blade coater, an air-knife coater, a squeeze coater, an impregnation coater, a transfer-roll coater, a kiss coater, a cast coater, and a spray coater.

In the multicoating processed in the above-mentioned wet-on-wet system, the uppermost magnetic layer is coated as a layer positioned under the uppermost layer remaining undried. Therefore, the surface of the lower layer, that means the interface between the lower layer and the uppermost layer, can be smoothened and, at the same time, the surface property of the uppermost layer can also be excellent and, in addition, the adhesive property between the upper and lower layers can also be improved. Resultingly, the required properties can be satisfied for such a magnetic tape as required to produce a high output and a low noise so as to perform a high density recording. Also, a layer peeling elimination, a layer hardness improvement and a satisfactory durability can also be realized to display a high durability. furthter, in a wet-on-wet multicoating system, a drop-out production can be reduced and the reliability can also be improved.

Surface smoothness

In the invention, the surface of the resulting magnetic recording medium may be smoothened successively in a calendering treatment.

After that, a varnish treatment or a blade treatment is carried out and then the recording medium is slit apart.

In the surface smoothening treatment, the calendering conditions include a temperature, a linear pressure, a coating speed (C/s) and so forth.

In the invention, it is preferable to keep the above-mentioned temperature, linear pressure and C/s within the ranges of 50° to 140° C., 50 to 400 kg/cm and 20 to 1,000 m/min., respectively.

After carrying out the above-mentioned treatments, the resulting uppermost layer is to have a thickness of not thicker than 0.6 μm and, preferably, within the range of 0.02 to 0.6 μm.

EXAMPLES

In the following examples, the term, "a part or parts" means "a part or parts by weight".

Example 1

A magnetic paint for the uppermost layer and a paint for the lower layer were each prepared by kneading and dispersing each of the components of the following magnetic compositions for the uppermost layer, provided that the average major axis sizes, crystal sizes and polyurethane layer thicknesses thereof were changed as shown in Table 1.

| | |
|---|---|
| Ferromagnetic powder {having an average major axis size of 150 nm, and Hc of 1700 Oe, a crystal size of 15 nm, a BET of 55 m²/g and Fe:Al:Ca = 100:4:1 (by weight)} | 100 parts |
| Vinyl chloride resin containing potassium sulfonate (MR-110 manufactured by Nippon Zeon Co., Ltd.) | 10 parts |
| Polyurethane resin containing sodium sulfonate (UR-8700 manufactured by Toyobo, Ltd.) | 10 parts |
| α-alumina (in 0.15 μm) | 8 parts |
| Carbon black (in 40 nm) | 0.5 parts |
| Stearic acid | 1 part |
| Butyl stearate | 1 part |
| Cyclohexanone | 100 parts |
| Methyl ethyl ketone | 100 parts |
| Toluene | 100 parts |

And, a coating paint $a_2$ was prepared by making use of a ferromagnetic metal having the different major axis length and crystal size.

(Magnetic paint for the uppermost layer-b)

This was prepared in the same manner as in the coating paint $a_1$, except that the ferromagnetic metal powder used in paint $a_1$ was replaced by Co-substituted barium ferrite having an Hc of 1100 Oe, a σs of 64 emu/g and a tabular-shape ratio of 4.

| | |
|---|---|
| α-Fe₂O₃ having a major axis length of 100 nm, minor axis length of 20 nm, crystal size of 18 nm and BET of 55 m²/g and surface-treated with an Si,Al compound having a Si content of 0.9 wt % and an Al content of 0.2 wt % each of the non-magnetic powder used | 100 parts |
| Vinyl chloride resin containing a potassium sulfonate (MR-110 manufactured by Nippon Zeon Co., Ltd.) | 12 parts |
| Polyurethane resin containing sodium sulfonate (UR-8700 or UR-8200 manufactured by Toyobo, Ltd.) | 8 parts |
| α-alumina (in 0.2 μm) | 5 parts |
| Carbon black (in 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

Besides, coating materials $A_2$ through $A_8$ were each prepared by making use of $\alpha$-$Fe_2O_3$ having the different average major axis length and crystal sizes.

Each of the resulting magnetic coating materials A for the uppermost layer was added by 5 parts of a polyisocyanate compound, Colonate L manufactured by Japan Polyurethane Ind. Co., Ltd..

(Paint for the lower layer-$B_1$)

Paint $B_1$ for the lower layer was prepared in the same manner as in paint $A_1$ for the lower layer, except that $\alpha$-$Fe_2O_3$ used in coating material $A_1$ for the lower layer was replaced by Co-$\gamma$-$Fe_2O_3$, having an Hc of 650 Oe.

The Co-$\gamma$-$Fe_2O_3$, used in paint $B_1$ had an average major axis length of 140 nm and crystal size of 30 nm, and a Si content of 0.8 % and an Al content of 0.1 wt % in the magnetic powder thereof.

A paint $B_2$ was prepared by making use of Co-$\gamma$-$Fe_2O_3$ having the different average major axis length and crystal size from coating material $B_1$.

(Paint $C_1$ for the lower layer)

This paint $C_1$ was prepared in the same manner as in coating material $a_1$, except that $\alpha$-$Fe_2O_3$ used in paint $A_1$ for the lower layer was replaced by Fe-Si-Al sendust alloy powder having an Hc of 40 (A/m), $\mu$ of 200 (H/m), average major axis length of 150 nm and crystal size of 15 nm and a Si content of 1.2 wt % and an Al content of 0.2 wt % in the powder.

Besides, the above, paint $C_2$ was also prepared in the same manner as in the coating material $C_1$, except that Fe-Si-Al sendust powder having the different average major axis length and crystal size was used.

Examples 1 through 9 and Comparative examples 1 through 7.

The above-mentioned magnetic paints for the uppermost layer and the paints for the lower layer each shown in Tables 1 and 2 were each coated on a 10 $\mu$m-thick polyethylene terephthalate film in a wet-on-wet system and, then, a magnetic field orientation treatment was carried out while the resulting coated layers remained undried and, successively, the coated film support was dried up. After that, a surface treatment was carried out with a celender, so that a magnetic layer was prepared to have the lower layers and the uppermost layer each having the thickness shown in Tables 1 and 2.

Further, on the rear side of the polyethylene terephthalate film surface side opposite to the side thereof coated with the magnetic layer, a coating material having the following composition was coated and then dried, so that a 0.8 $\mu$m-thick back coat layer was formed by applying a calendering treatment in accordance with the foregoing calendering conditions and, finally, a wide-roll master magnetic tape could be prepared.

| | |
|---|---|
| Carbon black (Raven 1035) | 40 parts |
| Barium sulfate (having an average particle size of 300 nm) | 10 parts |
| Nitrocellulose | 25 parts |
| Polyurethane resin (N-2301 manufactured by Japan Polyurethane Co.) | 25 parts |
| Polyisocyanate compound (Colonate L manufactured by Japan Polyurethane Co.) | 10 parts |
| Cyclohexanone | 400 parts |
| Methyl ethyl ketone | 250 parts |
| Toluene | 250 parts |

The resulting raw roll of magnetic tape was slit apart to prepare 8 mm-wide magnetic video recording media. The following evaluation were made on the resulting magnetic recording media and the result thereof will be shown in Table 2.

Evaluation

<CN property>

A single wave of 9 MHz was recorded and the output level obtained when the signal thereof is regenerated was compared to a standard sample.

<Running durability at a low temperature>

A tape was nm all the length of the tape by making use of S-550 (manufactured by Sony Corp. under the atmosphere of 0° C. It was regarded as a head clog when an RF output is lowered to not less than 2 dB continuously for one second or more, and the cases occurred were counted in number.

<Head touch property>

The resulting envelope property was observed on an oscilloscope and the resulting ratio (%) of the minimum output section to the maximum output section was measured.

TABLE 1

| Spec. & Property | | 1 | 2 | 3 | 4 | 5 | 6 | 7 | 8 | 9 |
|---|---|---|---|---|---|---|---|---|---|---|
| Paint for 1st layer | | $a_1$ | $a_1$ | $a_1$ | $a_1$ | $a_2$ | $a_1$ | b | b | b |
| Ave. maj. axis length | (nm) | 150 | 150 | 150 | 150 | 100 | 150 | 30 | 30 | 30 |
| Crystal size | (nm) | 15 | 15 | 15 | 15 | 12 | 15 | 30 | 30 | 30 |
| Layer thickness | ($\mu$m) | 0.3 | 0.3 | 0.3 | 0.3 | 0.3 | 0.2 | 0.3 | 0.3 | 0.3 |
| Paint for 2nd layer | | $A_1$ | $B_1$ | $C_1$ | $A_2$ | $A_3$ | $A_1$ | $A_1$ | $B_1$ | $C_1$ |
| Ave. maj. axis length | (nm) | 100 | 140 | 150 | 150 | 100 | 100 | 100 | 140 | 150 |
| Crystal size | (nm) | 18 | 30 | 15 | 30 | 15 | 18 | 18 | 30 | 15 |
| Layer thickness | ($\mu$m) | 0.5 | 0.5 | 0.5 | 0.5 | 0.5 | 0.7 | 0.5 | 0.5 | 0.5 |
| Kind of polyurethane | | UR8700 | UR8700 | UR8700 | UR8700 | UR8700 | UR8700 | UR8700 | UR8700 | UR8700 |
| Paint for 3rd layer | | $A_4$ | $B_2$ | $C_2$ | $A_5$ | $A_4$ | $A_4$ | $A_4$ | $B_2$ | $C_2$ |
| Ave. maj. axis length | (nm) | 200 | 220 | 230 | 250 | 200 | 200 | 200 | 220 | 230 |
| Crystal size | (nm) | 40 | 42 | 42 | 45 | 40 | 40 | 40 | 42 | 42 |
| Layer thickness | ($\mu$m) | 1.0 | 1.0 | 1.0 | 1.0 | 1.0 | 1.0 | 1.0 | 1.0 | 1.0 |
| Kind of Polyurethane | | UR8200 | UR8200 | UR8200 | UR8200 | UR8200 | UR8200 | UR8200 | UR8200 | UR8200 |
| CN property | | 4.5 | 2.5 | 2.5 | 3.5 | 5.7 | 5.0 | 3.5 | 1.3 | 1.5 |
| Runing durability at a low temp. | | 0 | 0 | 0 | 0 | 0 | 0 | 0 | 0 | 0 |
| Envelope property | (%) | 90 | 90 | 85 | 95 | 88 | 90 | 88 | 88 | 85 |

TABLE 2

| Spec. & Property | | Sample No. Comparative Example No. | | | | | | |
|---|---|---|---|---|---|---|---|---|
| | | 1 | 2 | 3 | 4 | 5 | 6 | 7 |
| Paint for 1st layer | | $a_1$ | $a_1$ | $a_1$ | $a_1$ | b | $a_1$ | b |
| Ave. maj. axis length | (nm) | 150 | 150 | 150 | 150 | 30 | 150 | 30 |
| Crystal size | (nm) | 15 | 15 | 15 | 15 | 30 | 15 | 30 |
| Layer thickness | (μm) | 0.3 | 0.3 | 0.3 | 0.3 | 0.3 | 0.3 | 0.3 |
| Paint for 2nd layer | | $A_1$ | $A_1$ | $B_1$ | $A_1$ | $A_1$ | $A_6$ | $A_6$ |
| Ave. maj. axis length | (nm) | 100 | 100 | 140 | 100 | 100 | 220 | 220 |
| Crystal size | (nm) | 18 | 18 | 30 | 18 | 18 | 38 | 38 |
| Layer thickness | (μm) | 1.5 | 0.5 | 0.5 | 0.5 | 1.5 | 0.5 | 0.5 |
| Kind of Polyurethane | | UR8700 | UR8700 | UR8700 | UR8700 | UR8700 | UR8700 | UR8700 |
| Paint for 3rd layer | | | $A_1$ | $B_1$ | $A_7$ | | $A_8$ | $A_8$ |
| Ave. maj. axis length | (nm) | | 100 | 140 | 80 | | 240 | 240 |
| Crystal size | (nm) | | 18 | 30 | 15 | | 40 | 40 |
| Layer thickness | (μm) | | 1.0 | 1.0 | 1.0 | | 1.0 | 1.0 |
| Kind of Polyurethane | | | UR8200 | UR8200 | UR8200 | | UR8200 | UR8200 |
| CN property | | 0.8 | 1.2 | −1.4 | −1.1 | −0.5 | 1.0 | −0.7 |
| Running durability at a low temp. | | 8 | 6 | 10 | 12 | 12 | 0 | 0 |
| Envelope property | (%) | 33 | 40 | 30 | 31 | 28 | 95 | 95 |

Example 2

A paint for the uppermost layer and a paint for the lower layer were each prepared by kneading and dispersing the components of the following magnetic composition for the uppermost layer by making use of a kneader and a sandmill.

| | |
|---|---|
| Ferromagnetic metal powder (refer to Tables 3–5) | 100 parts |
| Vinyl chloride type resin containing potassium sulfonate (MR-110 manufactured by Nippon Zeon Co.) | 10 parts |
| Polyurethane resin containing sodium sulfonate (having a Tg given in Tables 3 to 5) | 10 parts |
| α-alumina (having an average particle size of 0.15 μm) | 8 parts |
| Carbon black (having an average particle size of 40 nm) | 0.5 parts |
| Stearic acid | 1 part |
| Butyl stearate | 1 part |
| Cyclohexanone | 100 parts |
| Methyl ethyl ketone | 100 parts |
| Toluene | 100 parts |

This coating material was prepared in the same manner as in Magnetic coating material a for the uppermost layer, except that the ferromagnetic powder used in the coating material a was replaced by Co-substituted barium ferrite having an Hc of 1100 Oe, BET of 50 m²/g, σs of 64 emu/g and a tabular shape ratio of 4.

| | |
|---|---|
| α-Fe$_2$O$_3$ (having an average major axis length, crystal size and BET shown in Tables 1 to 3 and surface-treated with Si,Al compound having a Si content of 0.9 wt % and Al content of 0.2 wt % each of the non-magnetic powder used | 100 parts |
| Vinyl chloride type resin containing potassium sulfonate (MR-110 manufactured by Nippon Zeon Co.) | 12 parts |
| Polyurethane resin containing sodium sulfonate having a Tg given in Tables 1 to 3 | 8 parts |
| α-alumina having an average particle size of 0.2 μm | 5 parts |
| Carbon black having an average particle size of 15 nm | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the resulting magnetic coating material for the uppermost layer and coating material A for the lower layer, 5 parts of polyisocyanate compounds (Colonate L manufactured by Japan Polyurethane Ind. Co., Ltd.) was added.

(Paint B$_2$ for the lower layer)

This coating material was prepared in the same manner as in coating material A$_9$ for the lower layer, except that α-Fe$_2$O$_3$ used in the coating material A9 was replaced by Fe$_2$O$_3$ having an Hc of 650 Oe.

The paint B$_2$ had an agerage major axis length of 140 nm, crystal size of 30 nm and a Si content of 0.9 wt % and an Al content of 0.1 wt % in the magnetic powder used.

(Paint C$_2$ for the lower layer)

This paint was prepared in the same manner as in coating material A9, except that α-Fe$_2$O$_3$ used in coating material A was replaced by Fe-Si-Al sendust alloy powder having an Hc of 40 (A/m), μ of 200 (H/m), average major axis length of 80 nm, crystal size of 8 nm and a Si content of 1.2 wt % and an Al content of 0.2 wt % each of the powder used therein.

Examples 2 to 10 and Comparative Examples 1 to 7

The above-mentioned magnetic coating material for the uppermost layer and coating material for the lower layer each shown in Tables 3, 4 and 5 were each coated on a 10 μm-thick polyethylene terephthalate film in a wet-on-wet system and, then, a magnetic field orientation treatment was carried out while the resulting coated layers remained undried and, successively, the coated film support was dried up. After that, a surface treatment was carried out with a celender, so that a magnetic layer was prepared to have the lower layer and the uppermost layer each having the thickness shown in Tables 3, 4 and 5.

Further, on the rear side of the polyethylene terephthalate film surface side opposite to the side thereof coated with the magnetic layer, a paint the same a in Example 1 was coated and then dried, so that a 0.8 μm-thick back coat layer was formed by applying a calendering treatment in accordance with the foregoing calendering conditions and, finally, a raw-roll magnetic tape could be prepared.

The resulting master magnetic tape was slit apart to prepare 8 mm-wide magnetic video recording media. The following evaluation were made on the resulting magnetic recording media and the result thereof will be shown in Tables 3–5.

The composition of above-mentioned ferromagnetic metal powder in the spindle-shape

|  | Fe | Co | Ni | Si | Al | Ca | Nd |
|---|---|---|---|---|---|---|---|
| Overall composition | 100 | 6 | 3 | 2 | 4 | 0.5 | 3 (in wt %) |
| Surface composition | 100 | 0 | 0 | 50 | 100 | 10 | 10 (% in Atom number) |

The average major axis length, crystal size and BET: refer to Tables 1–3

<The overall composition>

In the ferromagnetic metal powder, the ratio of the presence of Fe, Co, Ni, Nd and Si, Al each contained in the overall composition was determined in the following manner. the fluorescent X-ray intensity of each element of a subject sample was measured by a wavelength dispersion type X-ray fluorescence analyzer (WDX) and then by calculating the results of the measurement in a fundamental parameter method, hereinafter referred to an FP method.

Now, the FP method will be detailed below.

For the fluorescent X-ray measurement, a WDX system 3080 manufactured by Rigaku Denki Co. was used under the following conditions.

X-ray tube : Rhodium bulb
Output : 50 KV, 50 mA
Spectroscopic crystal : LiF for Fe, Co, Ni and PET for Al and RX-4 for Si
Absorber : 1/1, 1/10 for Fe only
Filter : OUT
PHA : 15 to 30 for Al and Si, 10 to 30 for Fe, Co, Ni and Nd
Time count : Peak=40 sec., background=40 sec. (provided, 2 point were counted before and after the point of the peak.)

When measuring fluorescent X-rays, there is no limitation to the above-mentioned equipment, but various equipments may be used.

As for the standard samples, the following 4 kinds of metal compounds were used.

Standard sample 12 was an alloy SRM1219 containing C of 0.15 wt %, Mn of 0.42 wt %, P of 0.03 wt %, Si of 0.55 wt %, Cu of 0.16 wt %, Ni of 2.16 wt %, Cr of 15.64 wt %, Mo of 0.16 wt % and V of 0.06 wt %, manufactured by Analytical Reference Materials International Co.

Standard sample 2 was an alloy SRM1250 containing Ni of 37.78 wt %, Cr of 0.08 wt %, Mo of 0.01 wt %, Co of 16.10 wt % and Al of 0.09 wt %, manufactured by Analytical Reference Materials International Co.

Standard sample 3 was a magnetic iron oxide powder containing Mn of 0.14 wt %, P of 0.15 wt %, S of 0.19 wt %, Si of 0.36 wt %, Co of 3.19 wt %, Zn of 1.26 wt %, Ca of 0.07 wt % and Na of 0.02 wt %.

Standard sample 4 was ferromagnetic metal powder containing Nd of 2.73 wt %.

In standard samples 1 and 2, the element contents by wt % are the values of the data sheet supplied by the manufacturers. In standard samples 3 and 4, the element contents by wt % are the analytical values obtained through an ICP emission analyzer. These values were inputted as the element composition values to be used in a calculation made in the following FP method.

In the FP method, a calculation is made by making use of the soft ware version 2.1 for a fundamental parameter under the following conditions.

Sample model : Bulk sample
Balance component sample : Fe
Input component : Measured X-ray intensity (KCPS)
Analysis unit : wt %

The ratio (in wt %) of the presence of each element was converted into the ratio (in wt %) thereof in proportion to Fe atom of 100 wt %, so that the ratio of the presence was made quantitative.

<The surface composition>

In the composition of the surface of ferromagnetic metal powder, the ratios of Fe, Co, Ni, Si and Al elements made present therein were each obtained by making use of an XPS surface analyzer.

How to obtain the above-mentioned ratios will be detailed.

First, an XPS surface analyzer was set to be under the following conditions.

X-ray anode : Mg
Resolution : 1.5 to 1.7 eV, that was specified according to the half-value width at a 3d5/2 peak of clean Ag.

No adhesive tape was used to fix the samples. The kinds of XPS surface analyzers shall not specially be limited, but various kinds thereof can be used. However, in the invention, ESCALAB-200R manufactured by VG Co. was used.

A narrow scanning was carried out within the following measurement range and the spectra of each element were measured. At this time, the data-taking aperture was set to be 0.2 eV so as to integrate the counts not less than the lowest number of the counts as shown in Table 5.

In the obtained spectra, the energy position was so adjusted that the peak of C or higher could be 284.6 eV.

Next, for making a data-process on COMMON DATA PROCESSING SYSTEM, VERSION 2.3 (hereinafter referred to as VAMAS soft) manufactured by VAMAS-SCA-JAPAN, Inc., the above-mentioned spectra were transferred, by making use of the software each supplied by the respective manufacturers, finto a computer capable of processing the VAMAS soft.

By making use of the VAMAS soft, the transferred spectra were converted into a VAMAS format and the following data-process was then carried out.

Before carrying out a quantitative process, each element was calibrated in a count scale, so that 5-point smoothening process was carried out.

The quantitative process was as follows.

Centering around the peak positions of each element and within the foregoing quantitative range, a peak area intensity was obtained. By making use of the above-mentioned sensitivity coefficient, the atomic number % of each element was obtained. The atomic number % was set to be a quantitative value by converting into the atomic numbers of the subject element in proportion to 100 Fe atom numbers.

(Evaluation and Measurement method)

<CN property>
The same as in Example 1.

<Running property at a high temperature>
The same as in Example 1 except the test was performed under the atmosphere of 40° C. and 80% RH.

<Regenerated output lowered by a head clouding>
Measuring deck : S-550 (manufactured by Sony Corp.)

1. An 8M Hz signal was recorded for 10 minutes at 20° C. and 65% RH and the regeneration thereof was repeated 3 times.

2. An 8M Hz signal was recorded for 2 minutes at 20° C. and 65% RH and the regenerated output was measured through a spectrum analyzer to determine value A.

3. The subject tape was nm all the length at 20° C. and 20% RH.

4. An 8M Hz signal was recorded for 2 minutes at 20° C. and 20% RH and the regenerated output was measured through a spectrum analyzer to determine value B.

5. The difference between the two measurement values A-B corresponded to the resulting output deterioration.

<Young's modulus>

In the invention a Young's modulus was measured in the following manner.

Length of a sample : 200 mm
 Width of a sample 12.65 mm
 Stretching speed 100 mm/min.
 Relative humidity : 50%

A load was measured when stretching a sample under the above-mentioned conditions and a stretching force curve was made out, and, a Young's modulus was obtained from a 1%-stretching load.

<Tg measurement method>

A Tg was determined in the following manner. A measurement instrument, Vibron Model DDV-II-EA (manufactured by Toyo-Baldwin Co.) was used. While heating a sample having a thickness of 30 μm, a width of 10 mm and a length of 25 mm within the range of −100° C. to +100° C., and when a temperature gave the edge on the tape width a sinusoidal distortion wave having a frequency of 10 Hz and, at the same time, the temperature gave the other edge a maximum tan δ of the phase difference δ between the two spectra of a sine wave stress produced, the temperature was regarded as a Tg.

The results of the evaluation will be shown below.

TABLE 3

|  |  | Ex-1 | Ex-2 | Ex-3 | Ex-4 | Ex-5 | Ex-6 |
|---|---|---|---|---|---|---|---|
| Uppermost layer |  | $a_3$ | $a_3$ | $a_3$ | $a_4$ | $a_4$ | $b_2$ |
| Ave. maj. axis length | (nm) | 100 | 100 | 100 | 100 | 100 | 30 |
| Crystal size | (nm) | 12 | 12 | 12 | 12 | 12 | 30 |
| BET | (m$^2$/g) | 63 | 63 | 63 | 63 | 63 | 50 |
| Polyurethane Tg | (°C.) | 20 | 20 | 20 | 70 | 70 | 70 |
| Young's modulus | (kg/mm$^2$) | 750 | 750 | 750 | 850 | 850 | 650 |
| Layer thickness | (μm) | 0.2 | 0.2 | 0.2 | 0.2 | 0.2 | 0.2 |
| Lower layer adjacent to the uppermost layer |  | $A_9$ | $A_9$ | $C_2$ | $A_9$ | $A_{10}$ | $A_9$ |
| Ave. maj. axis length | (nm) | 80 | 80 | 80 | 80 | 80 | 80 |
| Crystal size | (nm) | 8 | 8 | 8 | 8 | 8 | 8 |
| BET | (m$^2$/g) | 65 | 65 | 65 | 65 | 65 | 65 |
| Polyurethane Tg | (°C.) | −20 | −20 | −20 | −20 | 20 | −20 |
| Young's modulus | (kg/mm$^2$) | 600 | 600 | 550 | 600 | 700 | 600 |
| Layer thickness | (μm) | 0.5 | 0.5 | 0.5 | 0.5 | 0.5 | 0.5 |
| Lower layer |  | $A_{11}$ | $B_2$ | $A_{11}$ | $A_{12}$ | $A_{12}$ | $A_{11}$ |
| Ave. maj. axis length | (nm) | 120 | 140 | 120 | 120 | 120 | 120 |
| Crystal size | (nm) | 20 | 30 | 20 | 20 | 20 | 20 |
| BET | (m$^2$/g) | 50 | 50 | 50 | 50 | 50 | 50 |
| Polyurethane Tg | (°C.) | 20 | 20 | 20 | 70 | 70 | 20 |
| Young's modulus | (kg/mm$^2$) | 750 | 770 | 750 | 900 | 900 | 750 |
| Layer thickness | (μm) | 1.0 | 1.0 | 1.0 | 1.0 | 1.0 | 1.0 |
| CN property | (dB) | 6.0 | 6.0 | 5.0 | 5.5 | 5.5 | 4.5 |
| Running property at a high temp. |  | 0 | 0 | 0 | 0 | 0 | 2 |
| Head cloudiness |  | −0.5 | −0.5 | −0.5 | −0.2 | −0.2 | −1.0 |

TABLE 4

|  |  | Ex-7 | Ex-8 | Ex-9 | Ex-10 |
|---|---|---|---|---|---|
| Uppermost layer |  | $a_5$ | $a_3$ | $a_3$ | $a_3$ |
| Ave. maj. axis length | (nm) | 150 | 100 | 100 | 100 |
| Crystal size | (nm) | 15 | 12 | 12 | 12 |
| BET | (m$^2$/g) | 56 | 63 | 63 | 63 |
| Polyurethane Tg | (°C.) | 20 | 20 | 20 | 20 |
| Young's modulus | (kg/mm$^2$) | 800 | 750 | 750 | 750 |
| Layer thickness | (μm) | 0.2 | 0.1 | 0.4 | 0.2 |
| Lower layer adjacent to the uppermost layer |  | $A_{12}$ | $A_9$ | $A_9$ | $A_9$ |
| Ave. maj. axis length | (nm) | 100 | 80 | 80 | 80 |
| Crystal size | (nm) | 10 | 8 | 8 | 8 |
| BET | (m$^2$/g) | 61 | 65 | 65 | 65 |
| Polyurethane Tg | (°C.) | −20 | −20 | −20 | −20 |
| Young's modulus | (kg/mm$^2$) | 630 | 600 | 600 | 600 |
| Layer thickness | (μm) | 0.5 | 0.5 | 0.5 | 1.0 |
| Lower layer |  | $A_{11}$ | $A_{11}$ | $A_{11}$ | $A_{11}$ |
| Ave. maj. axis length | (nm) | 120 | 120 | 120 | 120 |
| Crystal size | (nm) | 20 | 20 | 20 | 20 |
| BET | (m$^2$/g) | 50 | 50 | 50 | 50 |
| Polyurethane Tg | (°C.) | 20 | 20 | 20 | 20 |
| Young's modulus | (kg/mm$^2$) | 750 | 750 | 750 | 750 |
| Layer thickness | (μm) | 1.0 | 1.0 | 1.0 | 1.0 |
| CN property | (dB) | 5.0 | 6.0 | 5.5 | 6.0 |
| Running property at a high temp. |  | 0 | 0 | 0 | 0 |
| Head cloudiness |  | −0.7 | −0.5 | −0.5 | −0.5 |

TABLE 5

|  |  | C-1 | C-2 | C-3 | C-4 | C-5 | C-6 |
|---|---|---|---|---|---|---|---|
| Uppermost layer |  | $a_3$ | $a_4$ | $a_6$ | $b_2$ | $a_3$ | $a_3$ |
| Ave. maj. axis length | (nm) | 100 | 100 | 140 | 30 | 100 | 100 |
| Crystal size | (nm) | 12 | 12 | 15 | 30 | 12 | 12 |
| BET | (m²/g) | 63 | 63 | 57 | 50 | 63 | 63 |
| Polyurethane Tg | (°C.) | 20 | 70 | 20 | 70 | 20 | 20 |
| Young's modulus | (kg/mm²) | 750 | 850 | 800 | 650 | 750 | 750 |
| Layer thickness | (μm) | 0.2 | 0.2 | 0.2 | 0.2 | 0.2 | 2.7 |
| Lower layer adjacent to the uppermost layer |  | $A_{11}$ | $A_{13}$ | $A_{11}$ | $A_{11}$ | $A_{11}$ | None |
| Ave. maj. axis length | (nm) | 120 | 120 | 120 | 120 | 120 | — |
| Crystal size | (nm) | 20 | 20 | 20 | 20 | 20 | — |
| BET | (m²/g) | 50 | 50 | 50 | 50 | 50 | — |
| Polyurethane Tg | (°C.) | 20 | 70 | 20 | 20 | 20 | — |
| Young's modulus | (kg/mm²) | 750 | 850 | 750 | 750 | 750 | — |
| Layer thickness | (μm) | 0.5 | 0.5 | 0.5 | 0.5 | 2.5 | — |
| Lower layer |  | $A_{12}$ | $A_{11}$ | $A_{13}$ | $A_{11}$ | None | None |
| Ave. maj. axis length | (nm) | 120 | 120 | 100 | 120 | — | — |
| Crystal size | (nm) | 20 | 20 | 12 | 20 | — | — |
| BET | (m²/g) | 50 | 50 | 60 | 50 | — | — |
| Polyurethane Tg | (°C.) | 30 | 20 | 20 | 20 | — | — |
| Young's modulus | (kg/mm²) | 780 | 750 | 700 | 750 | — | — |
| Layer thickness | (μm) | 1.0 | 1.0 | 1.0 | 1.0 | — | — |
| CN property | (dB) | 3.0 | 2.5 | 2.8 | 1.5 | 1.2 | 0.4 |
| Running property at a high temp. |  | 5 | 6 | 5 | 9 | 9 | 11 |
| Head cloudiness |  | −2.3 | −2.0 | −2.2 | −3.2 | −2.9 | −3.4 |

C: Comparative example

When comparing Examples 1 to 10 to Comparative Examples 1 to 7 by taking the above-mentioned results into consideration, it was proved that, as indicated in Comparative Examples 1 to 5, the effects of the invention such as a high CN property, a high temperature running property and head cloudiness improvement cannot be achieved, even if a medium is triple-layered and unless the crystal sizes, Young's moduli or polyurethane Tg of each magnetic layer are suitably selected as in the invention. It was also proved that, as indicated in Comparative Examples 6 and 7, the effects of the invention cannot also be achieved in any conventional double- or single-layer structure.

What is claimed is:

1. A magnetic recording medium comprising
   a support;
   a first magnetic layer remote from said support and comprising magnetic particles and a first binder;
   a second layer, in contact with an inner face of said first layer, between said first layer and said support, said second layer comprising a second binder and particles having a crystal size, measured in nanometers, of $S_2$; and
   a third layer, between said second layer and said support, comprising a third binder and particles having a crystal size, measured in nanometers, of $S_3$;
   wherein $S_1 \leq 35$ and $S_2 < S_3$ and, in at least one of said second layer and said third layer, said particles are non-magnetic.

2. The medium of claim 1 wherein said first, second, and third layers each have Young's modulus, measured in Kg/mm², of $Y_1$, $Y_2$, and $Y_3$, respectively, and wherein $Y_1 > Y_2$, and $Y_3 > Y_2$.

3. The medium of claim 1 wherein said first, second, and third binders are polyurethane and have glass transition points, measured in °C., of $T_1$, $T_2$, and $T_3$, respectively and wherein
$T_1 > T_2$, and $T_3 > T_2$.

4. The medium of claim 1, wherein the surface of said non-magnetic particle is treated with a silicon compound or an aluminum compound.

5. The medium of claim 1, wherein said magnetic particles contained in said first layer have a crystal size measured in nanometers of $S_1$ and said crystal sizes $S_1$ and the crystal size of the particles contained in the second layer $S_2$ have the following relationship;
$S_1 > S_2$.

6. A magnetic recording medium comprising
   a support,
   a first magnetic layer remote from said support, comprising ferromagnetic metal particles or hexagonal barium-ferrite and a first binder, said first layer having a thickness of 0.01 to 0.7 μm;
   a second layer, in contact with an inner face of said first layer, between said first layer and said support, said second layer comprising a second binder and particles having a crystal size, measured in nanometers, of $S_2$, said second layer having a thickness of 0.5 to 2.0 μm; and
   a third layer, between said second layer and said support, comprising a third binder and particles having a crystal size, measured in nanometers, of $S_3$;
   wherein $S_2 \leq 35$ and $S_2 < S_3$, and said particles in said second layer or said third layer are non-magnetic needle-like particles of $\alpha$-$Fe_2O_3$.

* * * * *